(12) United States Patent
Mohr et al.

(10) Patent No.: US 8,595,930 B2
(45) Date of Patent: Dec. 3, 2013

(54) PRESS-FITTING CORROSION RESISTANT LINERS IN NOZZLES AND CASINGS

(75) Inventors: Byron L. Mohr, Olean, NY (US); David C. Seib, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 332 days.

(21) Appl. No.: 12/984,955

(22) Filed: Jan. 5, 2011

(65) Prior Publication Data

US 2011/0232290 A1  Sep. 29, 2011

Related U.S. Application Data

(60) Provisional application No. 61/316,927, filed on Mar. 24, 2010.

(51) Int. Cl.
*B21K 25/00* (2006.01)

(52) U.S. Cl.
USPC ............... 29/889.2; 29/428; 29/458; 29/889; 60/752; 156/294

(58) Field of Classification Search
USPC .................. 29/428, 458, 889, 889.2; 60/752; 156/294
See application file for complete search history.

(56) References Cited

U.S. PATENT DOCUMENTS

| | | | |
|---|---|---|---|
| 2,578,481 A | 12/1951 | Lombard | |
| 2,850,876 A | 9/1958 | Wood | |
| 3,420,434 A | 1/1969 | Swearingen | |
| 3,628,627 A | 12/1971 | Arnold | |
| 3,696,637 A | 10/1972 | Ness | |
| 4,198,740 A | 4/1980 | Prevender | |
| 4,398,867 A | 8/1983 | Dernedde | |
| 4,399,651 A | 8/1983 | Geary | |
| 4,432,824 A * | 2/1984 | Cook et al. | 156/165 |
| 4,477,223 A | 10/1984 | Giroux | |
| 4,484,689 A | 11/1984 | Fuchs, Jr. | |
| 4,524,996 A | 6/1985 | Hunt | |
| 4,545,101 A | 10/1985 | Hilts | |
| 4,759,178 A | 7/1988 | Joy | |
| 4,826,071 A | 5/1989 | Becker | |
| 4,834,622 A | 5/1989 | Schuh | |
| 4,870,732 A | 10/1989 | Becker | |
| 4,893,388 A | 1/1990 | Amos | |

(Continued)

FOREIGN PATENT DOCUMENTS

JP  2004190665  7/2004

OTHER PUBLICATIONS

International Application No. PCT/US2011/020219—Notification of Transmittal of International Search Report and Written Opinion mailed Sep. 14, 2011.

(Continued)

*Primary Examiner* — Richard Chang
(74) *Attorney, Agent, or Firm* — Edmonds & Nolte, PC

(57) ABSTRACT

An apparatus and method for protecting an inner radial surface of a housing of a turbomachine from corrosion. The method includes tapering the inner radial surface of the housing and a corresponding outer radial surface of a corrosion-resistant liner, and heating the housing to increase a diameter of the inner radial surface of the housing. The method also includes inserting the corrosion-resistant liner at least partially into the housing, and attaching the corrosion-resistant liner to the inner radial surface of the housing a solid-state bonding process.

12 Claims, 4 Drawing Sheets

(56) References Cited

U.S. PATENT DOCUMENTS

| | | |
|---|---|---|
| 4,903,888 A | 2/1990 | Clark |
| 4,959,523 A | 9/1990 | Fihey |
| 4,972,880 A | 11/1990 | Strand |
| 5,052,845 A | 10/1991 | Maus |
| 5,085,363 A | 2/1992 | Sims |
| 5,248,239 A | 9/1993 | Andrews |
| 5,605,361 A | 2/1997 | Sims |
| 5,671,532 A | 9/1997 | Rao |
| 5,775,302 A | 7/1998 | Guido |
| 5,918,911 A | 7/1999 | Sims |
| 5,957,507 A | 9/1999 | Asada |
| 6,085,545 A | 7/2000 | Johnston |
| 6,134,876 A | 10/2000 | Hines |
| 6,154,946 A | 12/2000 | Kapp |
| 6,310,414 B1 | 10/2001 | Agahi |
| 6,439,836 B1 | 8/2002 | Pozivil |
| 6,506,017 B2 | 1/2003 | Mariotti |
| 6,581,409 B2 | 6/2003 | Wilding |
| 6,955,288 B2 | 10/2005 | Barnes |
| 7,726,022 B2 * | 6/2010 | Trbojevic et al. ............ 29/889.2 |
| 8,256,089 B2 * | 9/2012 | Pionetti ............................ 29/458 |
| 8,398,700 B2 * | 3/2013 | Leopold et al. ............... 623/1.12 |
| 2003/0024629 A1 | 2/2003 | Wright |
| 2006/0027628 A1 | 2/2006 | Sutherlin |
| 2008/0216510 A1 | 9/2008 | Vandor |
| 2009/0205839 A1 | 8/2009 | Cook |
| 2009/0257902 A1 | 10/2009 | Ernens |
| 2009/0293503 A1 | 12/2009 | Vandor |

OTHER PUBLICATIONS

International Application No. PCT/US2011/021369—Notification of Transmittal of International Search Report and Written Opinion mailed Sep. 28, 2011.

International Application No. PCT/US2011/022716—Notification of Transmittal of the International Search Report and Written Opinion mailed Oct. 24, 2011.

* cited by examiner

PRESS-FITTING CORROSION RESISTANT LINERS IN NOZZLES AND CASINGS

CROSS-REFERENCE TO RELATED APPLICATIONS

This application claims priority to U.S. Provisional Patent Application Ser. No. 61/316,927, which was filed Mar. 24, 2010. The priority application is hereby incorporated by reference in its entirety into the present application.

BACKGROUND

Various industrial processes and equipment operate at high temperature and/or pressure, and do so in environments containing corrosive fluids. In these environments, typical iron and steel equipment surfaces can be degraded by corrosive reactions with elements of the corrosive fluids, which can include, for example, carbon dioxide, hydrogen sulfide, chloride ions, and the like.

One way to avoid corrosion is to provide a protective liner that separates the corrosion-susceptible equipment surfaces from the corrosive fluids. Certification standards, such as those set by the National Association of Corrosion Engineers (NACE), typically require a bond between the protective liner and the equipment surface. Accordingly, mechanical fits fall short of these standards; however, bonding the protective liner to the equipment surfaces such that the bond is essentially free of voids, oxide films, and/or discontinuities, while still having a long corrosion-protecting life, and being compliant with certification standards, may present a challenge. This challenge may be made more difficult when it is desired to create and protect generally cylindrical equipment housings for the tubomachines.

One way to adjoin a corrosion-resistant protective liner with a corrosion-susceptible surface is known as explosive cladding. In explosive cladding, the corrosive-resistant liner is placed on the surface to be protected of the corrosion-susceptible equipment, and then an explosion is set off proximate thereto, typically with both the liner and the equipment disposed underwater. The explosion plasticizes the surfaces of both the equipment and the liner and produces a bond therebetween. Explosive cladding, however, is typically limited in application to flat surfaces. Accordingly, if a generally cylindrical equipment housing is desired, a flat plate generally must be clad, which is subsequently rolled and welded. This additional working adds cost and time to the bonding process. Furthermore, explosive cladding requires careful planning, specialized equipment, and ballistics expertise to deal with dangerous explosive devices.

Another way to create a protective liner is to provide a weld overlay. In this process, a weld material is deposited in a layer on the equipment surface, and the process is repeated many times until a desired thickness is reached. This process, however, is time-consuming and expensive both in terms of labor and equipment. Furthermore, this process allows for potential weld defects, which, if present, may require additional reworking of the welding process, further increasing the expense and time associated with this process.

What is needed, therefore, is a process and apparatus in which a corrosive-resistant protective liner is bonded to an equipment surface, with the bonding process and apparatus generally minimizing the potential for defects in the bond and/or the shape of the apparatus.

SUMMARY

Embodiments of the disclosure may provide an exemplary method for protecting an inner radial surface of a housing of a turbomachine from corrosion. The exemplary method may include tapering the inner radial surface of the housing and a corresponding outer radial surface of a corrosion-resistant liner, and heating the housing to increase a diameter of the inner radial surface of the housing. The exemplary method may further include inserting the corrosion-resistant liner at least partially into the housing, and attaching the corrosion-resistant liner to the inner radial surface of the housing a solid-state bonding process.

Embodiments of the disclosure may also provide an exemplary apparatus for processing corrosive fluid. The exemplary apparatus may include a housing defining a tapered bore having a decreasing inner diameter, and a corrosion-resistant liner having a tapered exterior surface defining a corresponding decreasing outer diameter. The exemplary apparatus may also include an interface defined between the corrosion-resistant liner and the housing, the interface being substantially free from welded material and configured to provide a bond between the corrosion-resistant liner and the housing.

Embodiments of the disclosure may further provide an exemplary method for protecting a turbomachine from corrosion. The exemplary method may include tapering an annular inner surface of a housing to define first and second inner diameters, and tapering an annular outer surface of a corrosion-resistant liner to define first and second outer diameters, the first outer diameter and the first inner diameter being substantially the same size, and the second outer diameter and the second inner diameter being substantially the same size. The exemplary method may also include enlarging the first and second inner diameters, which includes placing the housing in a furnace at a temperature of from about 700° F. to about 900° F., heating the furnace to an increased temperature of from about 1200° F. to about 2100° F., and holding the housing in the furnace for about 1 hour per inch of a cross-sectional thickness of the housing. The exemplary method may further include removing the housing from the furnace while protecting the housing in a protective atmosphere, and inserting the corrosion-resistant liner at least partially into the housing such that the first outer diameter is substantially aligned with the first inner diameter. The exemplary method may also include fixing the corrosion-resistant liner to the annular inner surface by explosive cladding or by hot press forging the corrosion-resistant liner to the annular inner surface by applying a pressure of from about 0.1 MPa to about 100 MPa to the corrosion-resistant liner using a hydraulic press forge.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
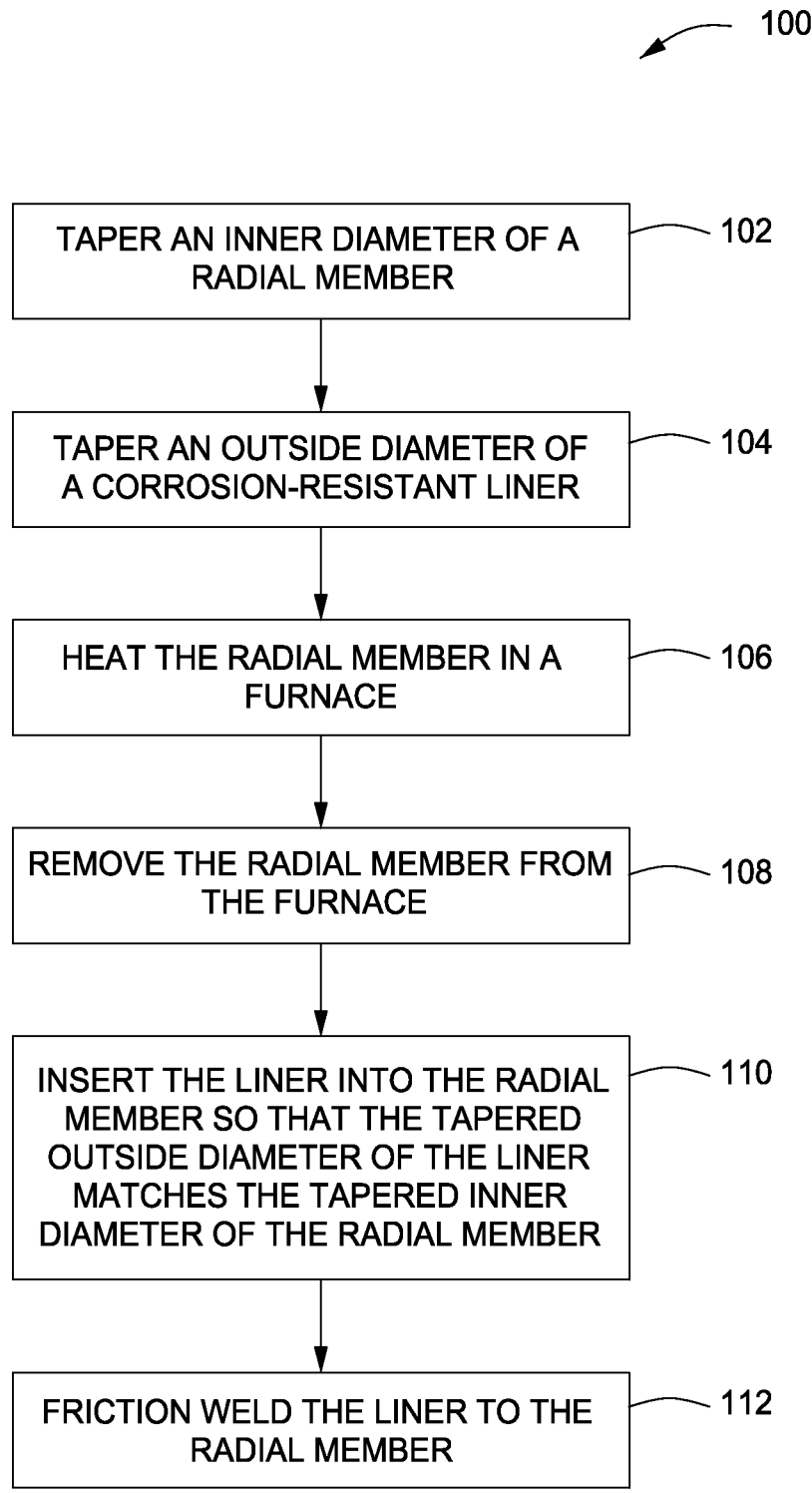
FIG. 1 illustrates a flow chart of an exemplary method for protecting a turbomachine from corrosion, in accordance with the disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a flow chart of an exemplary method 100 of protecting a surface of a turbomachine from corrosion. The method 100 may begin at 102, where an inner diameter of a radial member of the turbomachine may be tapered. In various embodiments, the radial member may be a housing, such as a casing or a nozzle, but in other embodiments, may be any other type of radial member. Furthermore, the term "radial member" is intended to encompass any piece of machinery that has at least a partially radial bore defined therein. As such, "radial member" is not limited to a structure that is entirely radial in cross-section. After, during, or prior to tapering the inner diameter of the radial member at 102, the method 100 may include tapering an outside diameter of a corrosion-resistant liner, as at 104. The method 100 may also include heating the radial member in a furnace, as at 106. Thereafter, the method 100 may include removing the radial member from the furnace, as at 108. The method 100 may also include inserting the corrosion-resistant liner into the radial member, such that the tapered outside diameter of the corrosion-resistant liner matches the tapered inner diameter of the radial member, as at 110. The method may also include attaching the corrosion-resistant liner to the radial member, as at 112, to provide a solid-state bond between the liner and the radial member using a solid-state attachment process, which may include friction welding and/or explosive cladding.

As the term is used herein, "friction welding" generally includes forge welding and hot press welding, which may also referred to herein as hot pressure welding. Furthermore, as the term "attach" is used herein, it encompasses any process or device for securing two parts together for any intended operation. Each of the respective processes of method 100 will be described in turn, with reference to exemplary embodiments of the components which are depicted in the following figures.

Figure 2:
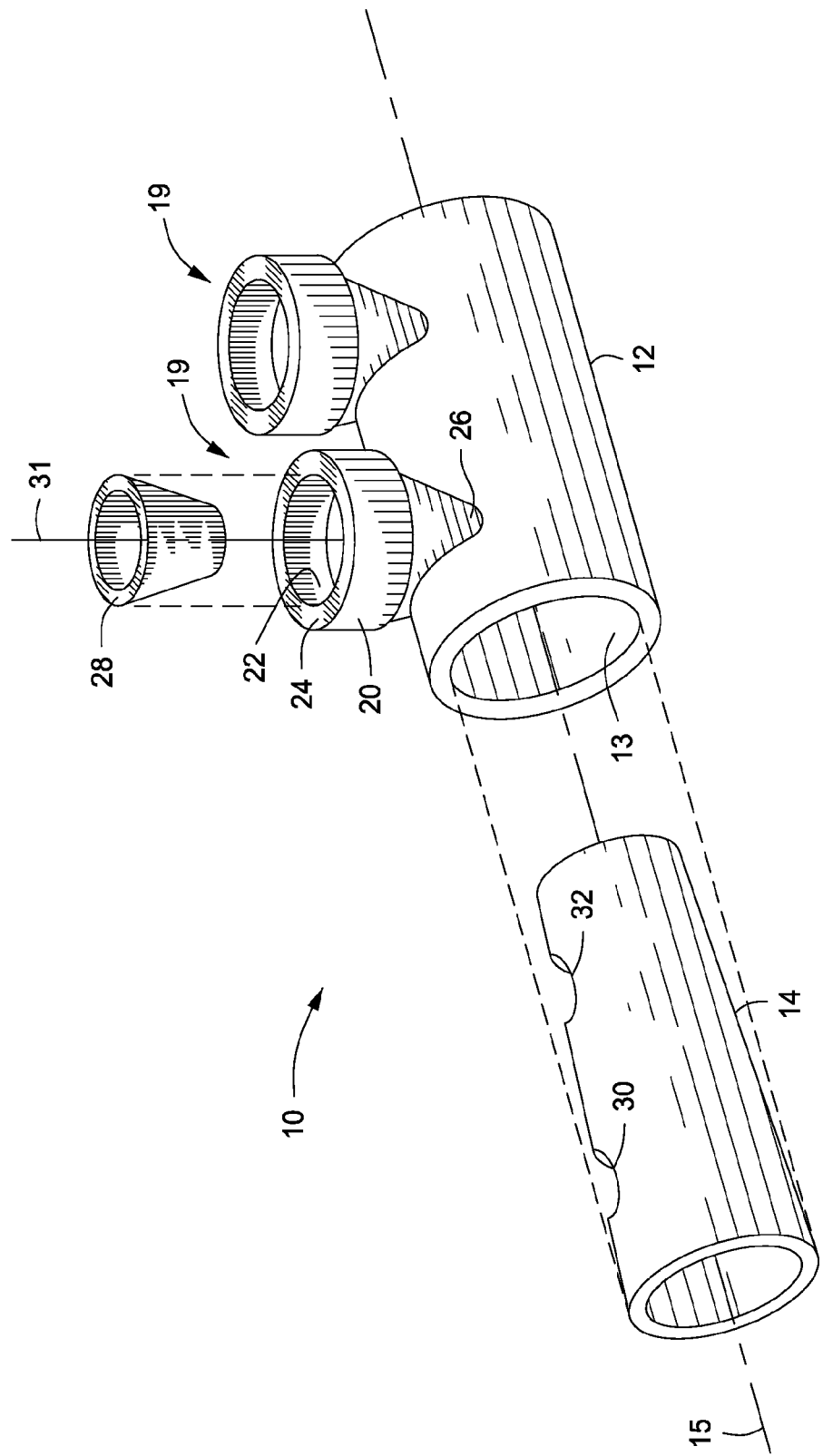
FIG. 2 illustrates a partial exploded view of an exemplary turbomachine housing, in accordance with the disclosure.

FIG. 2 illustrates a partial exploded view of an exemplary turbomachine housing 10, which may be constructed employing an exemplary embodiment of the method 100, described above with reference to FIG. 1. The housing 10 may include a casing 12, which may define a central bore 13 therein. The casing 12 may be constructed of any suitable material, such as carbon steel, alloy steel, or the like. Further, the casing 12 may be of a thickness sufficient to allow the casing 12 to contain fluid-processing equipment (not shown), such as blades, impellers, stators, combinations thereof, or the like, which may process corrosive fluids at a high pressure. In various exemplary embodiments, the fluid processing equipment may operate at pressures within the casing 12 ranging from a low of about 300 psi, about 1,000 psi, or about 3,000 psi to a high of about 12,000 psi, about 15,000 psi, or about 17,000 psi or greater, although such range is merely exemplary and higher or lower pressure casings may be employed according to this disclosure.

The casing 12 may be susceptible to corrosion, and therefore, the housing 10 may include a corrosion-resistant liner 14. In various exemplary embodiments, the corrosion-resistant liner 14 may or may not provide additional structural support for the casing 12. The corrosion-resistant liner 14 is constructed of materials designed to resist degradation in the fluidic environment of the housing 10. For example, the corrosion-resistant liner 14 may be or include one or more stainless steel alloys, one or more nickel alloys, one or more cobalt alloys, titanium, zirconium, combinations thereof, or like materials. In various exemplary embodiments, the material of which the corrosion-resistant liner 14 is constructed may vary, for example, according to the intended application. Furthermore, the casing 12 and the corrosion-resistant liner 14 may both be substantially radial or annular in cross-section, and may be concentric, thereby defining a central axis 15 therein.

The housing 10 may also include nozzles 19. Although two nozzles 19 are shown, additional nozzles 19 may be employed. For example, a back-to-back compressor or a compressor with one or more inter-stage sidestreams may require additional nozzles 19. Similarly, various turbines, pumps, and other turbomachines of various configurations known in the art may require additional or fewer nozzles 19.

One or more of the nozzles 19 may include a nozzle body 20, which may define a nozzle bore 22 therein. The nozzle bore 22 may extend from a first nozzle end 24 of the nozzle body 20 to a second nozzle end 26 of the nozzle body 20. In an exemplary embodiment, either or both of the first and second nozzle ends 24, 26 may include a flange for attaching the nozzle 19 to the casing 12. The nozzle body 20 may be coupled to the casing 12 proximal the second nozzle end 26 using any suitable coupling method, such as welding, brazing, bonding, casting, forging, fastening, combinations thereof, or the like.

The nozzles 19 may be made of a material that shares the corrosion-susceptible properties of the casing 12. For example, the nozzle body 20 may be made of the same material as the casing 12. Accordingly, the housing 10 may include a corrosion-resistant nozzle liner 28, which may be disposed at least partially in the nozzle body 20, as shown. The corrosion-resistant nozzle liner 28 may be constructed of any suitably corrosion-resistant material, which may vary in different embodiments, for example, according to the intended application. In various exemplary embodiments, the nozzle liner 28 may be or include one or more stainless steel alloys, one or more nickel alloys, one or more cobalt alloys, titanium, zirconium, combinations thereof, or the like. Moreover, it will be appreciated that in one or more embodiments either, both, or any (in embodiments having more than two nozzles 19) of the nozzles 19 may include a corrosion-resistant nozzle liner 28. Furthermore, in an exemplary embodiment, the nozzles 19 and the corrosion-resistant nozzle liner 28 may be generally annular in cross-section, thereby defining a nozzle axis 31 therethrough. It will be appreciated that any combination of components having corrosion-resistant liners is within the scope of this disclosure. For example, the casing 12 may be provided with corrosion-resistant liner 14, while the corrosion-resistant nozzle liner 28 may be omitted, or vice versa.

Referring again to the corrosion resistant liner 14, therein may be defined axially-spaced, radially-extending apertures 30, 32. The casing 12 may similarly provide axially-spaced, radially-extending apertures therein, which are shown in and described below with reference to FIGS. 3-5, with each of the nozzles 19 being disposed around a separate one of the apertures of the casing 12. The apertures 30, 32 of the corrosion-resistant liner 14 may be aligned with the apertures of the casing 12 to provide fluid communication from inside of the corrosion-resistant liner 14 therethrough, through the casing 12, and into and/or from the nozzles 19. The apertures 30, 32 may be cut or otherwise formed in the corrosion-resistant liner 14 prior to or after inserting the corrosion-resistant liner 14 into the casing 12.

Figure 3:
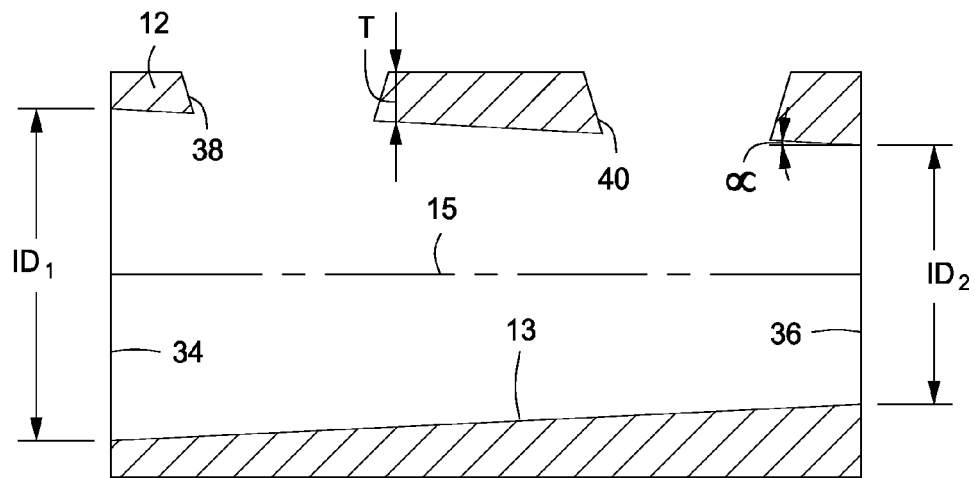
FIG. 3 illustrates a side cross-sectional view of an exemplary casing of the turbomachine housing, in accordance with the disclosure.

With additional reference to FIG. 1, FIG. 3 illustrates a side cross-sectional view of an exemplary embodiment of the casing 12, which may provide an exemplary embodiment of the radial member of the method 100. FIG. 3 thus illustrates the casing 12, showing the central bore 13 extending between opposing first and second axial sides 34, 36 of the casing 12. Axially-offset, radially-extending apertures 38, 40 may be defined in the casing 12, as noted above with reference to FIG. 2. As shown, the apertures 38, 40 may be tapered to receive the nozzle 19 (FIG. 2); however, in various exemplary embodiments, the apertures 38, 40 may be substantially cylindrical, elliptical, or any other shape. Additionally, the casing 12 may define a nominal cross-sectional thickness T, which may be defined as the average radial thickness of the casing 12.

As at 102 of method 100 (FIG. 1), the central bore 13, providing the inside diameter of the casing 12, may be tapered. As such, the casing 12 may have a first inner diameter $ID_1$ proximal the first axial side 34 and a second inner diameter $ID_2$ proximal the second axial side 36. The second inner diameter $ID_2$ may be smaller than the first inner diameter $ID_1$, such that the central bore 13 decreases in cross-sectional area (i.e., converges) proceeding from the first axial side 34 to the second axial side 36; however, in various embodiments, the relative sizing of the first and second interior diameters $ID_1$, $ID_2$ may be reversed. An angle $\alpha$ may be defined between the central bore 13 and a line parallel to the central axis 15 of the casing 12, and may be referred to as the "pitch" of the central bore 13. In one or more embodiments, the pitch may be less than about 40 degrees, less than about 35 degrees, less than about 30 degrees, or less than about 25 degrees. Furthermore, in an exemplary embodiment, the pitch may be less than about 33 degrees, for example, between about 1 degree and about 15 degrees.

The central bore 13 may be tapered by any process known in the art. For example, the casing 12 may begin as a solid cylinder and may be machined on a lathe, mill, or drill to provide the tapered central bore 13. In other exemplary embodiments, the casing 12 may begin as a flat plate, which may be rolled to produce a frustoconical geometry. In another exemplary embodiment, the casing 12 may be cast using any suitable casting process. Moreover, any processes for providing a tapered central bore 13 are within the scope of this disclosure.

Figure 4:
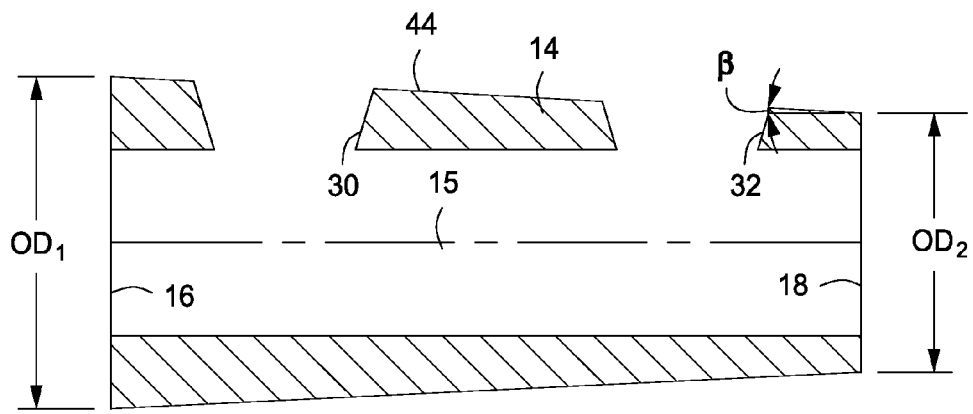
FIG. 4 illustrates a side cross-sectional view of an exemplary corrosion-resistant liner, in accordance with the disclosure.

With continuing reference to FIG. 1, FIG. 4 illustrates a side cross-sectional view of an exemplary embodiment of the corrosion-resistant liner 14. The corrosion-resistant liner 14 may have the apertures 30, 32, as generally described above, and may extend between first and second axial ends 16, 18. As shown, the apertures 30, 32 may be tapered; however, in various exemplary embodiments, the apertures 30, 32 may be cylindrical, elliptical, or any other shape. Furthermore, the corrosion-resistant liner 14 may include an exterior surface 44.

As at 102 of method 100, the exterior surface 44 of the corrosion-resistant liner 14 may be tapered. As such, proximal the first axial end 16, the exterior surface 44 may have a first outside diameter $OD_1$, and proximal the second axial end 18, the exterior surface 44 may have a second outside diameter $OD_2$. The second outside diameter $OD_2$ may be smaller than the first outside diameter $OD_1$, such that the diameter of the exterior surface 44 decreases proceeding from the first axial end 16 to the second axial end 18; however, the relative sizing of the first and second outer diameters $OD_1$, $OD_2$ may be reversed. In various exemplary embodiments, an angle $\beta$ may be defined between the exterior surface 44 and a line parallel to the central axis 15, which may be referred to as the pitch of the exterior surface 44. In one or more embodiments, the pitch may be less than about 40 degrees, less than about 35 degrees, less than about 30 degrees, or less than about 25 degrees. In an exemplary embodiment, the pitch may be less than about 33 degrees, for example, between about 1 degree and about 15 degrees.

The exterior surface 44 may be tapered by any process known in the art. For example, the corrosion-resistant liner 14 may begin as a cylinder and may be machined on a lathe and/or mill to provide the tapered exterior surface 44. In another exemplary embodiment, the corrosion-resistant liner 14 may begin as a flat plate, which may be rolled to produce a frustoconical geometry. In yet another exemplary embodiment, the corrosion-resistant liner 14 may be cast using any suitable casting process. Further, the corrosion-resistant liner 14 may include a substrate, clad, plated, or otherwise layered with corrosion-resistant material, such as stainless steel, a nickel alloy, a cobalt alloy, zirconium, titanium, combinations thereof, or the like. In another exemplary embodiment, the corrosion-resistant liner 14 may be a solid plug that is inserted into the casing 12 and thereafter machined to provide a desired interior shape and thickness, as well as any desired internal features, such as grooves, apertures, and/or the like. However, other manufacturing methods of providing a tapered corrosion-resistant liner 14 are within the scope of this disclosure.

Figure 5:
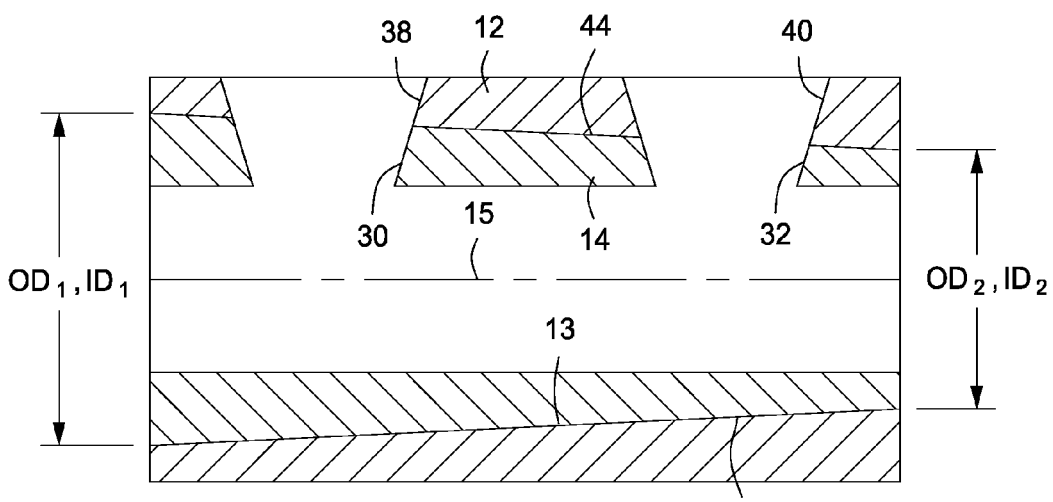
FIG. 5 illustrates a side cross-sectional view of the exemplary casing with the exemplary corrosion-resistant liner disposed therein, in accordance with the disclosure.

With continuing reference to FIG. 1, FIG. 5 illustrates a side cross-sectional view of the corrosion-resistant liner 14 and the casing 12 mated together to form an interface 46 therebetween. Prior to inserting the corrosion-resistant liner 14 into the casing 12, the exterior surface 44 of the corrosion-resistant liner 14 and the central bore 13 of the casing 12 may be cleaned, machined, and/or polished to remove roughness, achieve optimum roughness, and/or to remove particulate matter. In an exemplary embodiment, the exterior surface 44 and the central bore 13 may be cleaned or polished by grit blasting using, for example, stainless steel and/or nickel alloy shot. Furthermore, the cleaning or polishing process may provide a surface finish having a roughness of, for example, not more than about 64 RMS, expressed in micro-inches. It will be appreciated, however, that other RMS value ranges may be provided without departing from the scope of this disclosure.

As at 104 of the method 100, prior to inserting the corrosion-resistant liner 14, the casing 12 may be heated, for example, to increase the dimensions thereof and to allow hot working thereof. The casing 12 may be placed in a furnace (not shown) that has been pre-heated, for example, to a pre-heat temperature of from about 600° F., about 650° F., or about 700° F. to about 900° F., about 950° F., or about 1000° F. Subsequent to placing the casing 12 in the furnace, the temperature of the furnace may be increased to a forge welding temperature of, for example, from about 1300° F., about 1400° F., about 1500° F. to about 1900° F., about 2000° F., or about 2100° F. In various exemplary embodiments, the temperature of the furnace may be heated from the pre-heat temperature to the forge welding temperature at a rate of from about 125° F./hour, about 150° F./hour, or about 175° F./hour to about 225° F./hour, about 250° F./hour, or about 275° F./hour, although other heating rates are contemplated herein.

The furnace may maintain the forge welding temperature, with the casing 12 continuing to be disposed therein for a heating period. The heating period may be determined by the nominal cross-sectional thickness T (FIG. 3) of the casing 12, for example. In various exemplary embodiments, the heating period may be from about 30 minutes, about 40 minutes, or about 50 minutes to about 70 minutes, about 80 minutes, or about 90 minutes per inch of nominal cross-sectional thickness T. Furthermore, the minimum amount of time for the heating period may be about three hours, for example, notwithstanding the nominal cross-sectional thickness T of the casing 12.

During the heating process, the casing 12, and particularly the central bore 13, may be held in a protective atmosphere to prevent oxidation of the central bore 13, which may inhibit solid-state bonding, which is described in greater detail below. The protective atmosphere may include one or more inert gases, such as argon, which may be introduced to the interior of the casing 12. For example, the protective atmosphere may be introduced to the interior of the casing 12, and a lid or seal may then be placed over any openings of the casing 12, isolating the interior of the casing 12 from the exterior thereof. This prevents the introduction of non-inert gases during and subsequent to the heating process. Thus, the central bore 13 of the casing 12 may avoid contacting non-inert gases, thereby avoiding oxidation.

As at 108 of the method 100, the casing 12 may be removed from the furnace, although it may still be maintained in the protective atmosphere to prevent oxidation. At such point, the interior diameter of the casing 12 may have been expanded by the heating process such that the corrosion-resistant liner 14 can be slidably received into the central bore 13. However, prior to inserting the corrosion-resistant liner 14, the dimensions may be measured to ensure compliance with maximum allowable tolerances, and the casing 12 reheated if the dimensions fall outside of the tolerable range.

As at 110 of the method 100, the corrosion-resistant liner 14 may be inserted into the casing 12, although this may also occur prior to removing the casing 12 from the furnace. As the exterior surface 44 and the central bore 13 may be complementarily tapered, additional force pushing the corrosion-resistant liner 14 into the casing 12 may increase the tightness of the fit. In an exemplary embodiment, after insertion, the apertures 30, 32, 38, and 40 may be aligned as shown to allow fluid communication radially through the casing 12 and the corrosion-resistant liner 14. In various exemplary embodiments, the apertures 30, 32, 38, 40 may be cut or otherwise formed in the casing 12 or corrosion-resistant liner 14 prior to, during, or after insertion of the corrosion-resistant liner 14. Furthermore, the first inner and outer diameters $ID_1$, $OD_1$, and the second inner and outer diameters $ID_2$, $OD_2$ may be substantially the same, such that the corrosion-resistant liner 14 may be snugly received into the casing 12. While the casing 12 cools, the central bore 13 may tend to shrink, thereby providing a press-fit between the casing 12 and the corrosion-resistant liner 14, which may be, for example, a "light" press fit, as is known in the art.

The press-fit provided by the relative sizing of the corrosion-resistant liner 14 and the casing 12, however, may not be sufficient to permanently attach and/or may not meet certification requirements for attaching the corrosion-resistant liner 14 to the casing 12. Accordingly, the corrosion-resistant liner 14 may be attached to the casing 12 using a solid-state bonding process, as at 112 of the method 100. For example, the corrosion-resistant liner 14 may be forge welded to the casing 12. In an exemplary embodiment, a hydraulic, open-die, hot press forge may be provided to implement the forging welding process, although other press forges may be used in accordance with this disclosure.

In various exemplary embodiments, the press forge may have a working pressure of from about 0.1 MPa, about 1 MPa, about 15 MPa, about 20 MPa, or about 25 MPa to about 30 MPa, about 35 MPa, about 40 MPa, about 90 MPa, or about 100 MPa or greater. The working pressure used may be generally proportional on the diameter and/or relative surface area of the casing 12. For example, relatively small casings 12, such as the casing used in DATUM® compressors of frame size D2, commercially available from Dresser-Rand Co., will typically require significantly less working pressure than do relatively large casings 12, for example, those used in DATUM® compressors of frame size D28, also commercially available from Dresser-Rand Co. In an exemplary embodiment, the press forge may have a clear opening range of from about 70 inches, about 80 inches, or about 90 inches to about 205 inches, about 225 inches, or about 245 inches or greater. In an exemplary embodiment, the press forge may have a stroke range of from about 25 inches, about 30 inches, or about 35 inches to about 75 inches, about 85 inches, or about 95 inches or greater.

In another exemplary embodiment, the corrosion-resistant liner 14 may be fixed in the cylindrical casing 12 using explosive cladding, which is also defined herein as a solid-state bonding process. Such explosive cladding includes affixing one or more explosive devices (not shown), which may be any suitable explosive devices, to the liner 14. Further, the casing 12 and liner 14 may be submerged into a water bath, to control the detonation. When it is desired to permanently affix the liner 14 to the casing 12, the explosive devices may detonate, with the explosion causing the surfaces of the liner 14 and the casing 12 that face each other plasticizing and thus becoming welded together.

Since forge welding and explosive cladding are types of solid-state diffusion bonding process, no molten weld material is formed, and, in an exemplary embodiment, none is added during the adjoining process. As such, the interface 46 is free from alloyed welding material and weld-fill material. Instead, the interface 46 may provide an atomic diffusion of at least a portion of the exterior surface 44 with the central bore 13. The interface 46 may thus provide a bond that is stronger than the connection supplied by a simple resistance fit; furthermore, such bond may be in compliance with NACE certification standards, whereas a resistance fit would be non-compliant. In various exemplary embodiments, however, welding material and/or weld-fill material may be added to strengthen the solid-state bond. Furthermore, in an exemplary embodiment, no fastening holes need be drilled through the corrosion-resistant liner 14, thereby avoiding the creation of diffusion channels therethrough.

Figure 6:
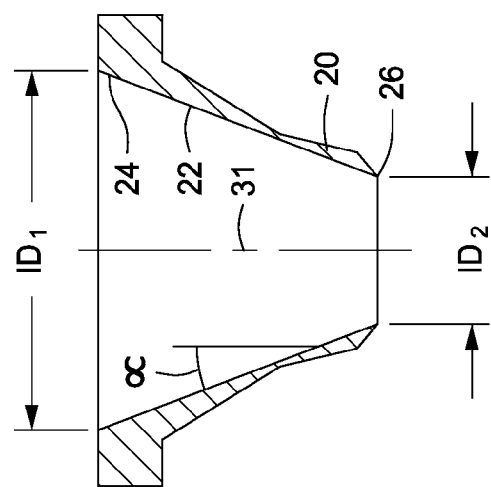
FIG. 6 illustrates a side cross-sectional view of an exemplary nozzle body, in accordance with the disclosure.

With continuing reference to FIG. 1, FIG. 6 illustrates a side cross-sectional view of an exemplary nozzle body 20. The nozzle body 20 may provide another exemplary radial member, as described above with reference to the method 100 of FIG. 1. The nozzle body 20 may include the nozzle bore 22 extending between the first and second nozzle ends 24, 26, and may be tapered to provide a tapered inner diameter, as at 102 of the method 100. Accordingly, the nozzle bore 22 may define a first inside diameter $ID_1$ proximal the first nozzle end 24, and a second inside diameter $ID_2$ proximal the second nozzle end 26. In an exemplary embodiment, the second inside diameter $ID_2$ may be smaller than the first inside diameter $ID_2$; however, in various other exemplary embodiments, the relative sizes of the first and second inside diameters $ID_1$ and $ID_2$ may be reversed. In an exemplary embodiment, the inside diameter of the nozzle bore 22 may decrease proceeding from the first nozzle end 24 to the second nozzle end 26. Further, an angle $\alpha$ may be defined between the nozzle bore 22 and a line parallel to the nozzle axis 31, which may be referred to as the pitch of the nozzle bore 22. In various exemplary embodiments, the pitch may be less than about 40 degrees, less than about 35 degrees, less than about 30 degrees, or less than about 25 degrees. In an exemplary embodiment, the pitch may be less than about 33 degrees, for example, between about 1 degree and about 15 degrees.

Figure 7:
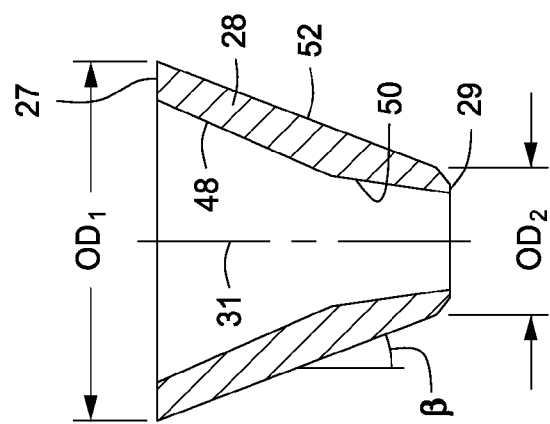
FIG. 7 illustrates a side cross-sectional view of an exemplary corrosion-resistant nozzle liner, in accordance with the disclosure.

With continuing reference to FIG. 1, FIG. 7 illustrates a side cross-sectional view of the nozzle liner 28, which may be an exemplary embodiment of the corrosion-resistant liner of method 100. The nozzle liner 28 may thus be tapered to provide a tapered exterior surface 52, as at 104 of method 100. Accordingly, a first outside diameter $OD_1$ proximal a first nozzle liner end 27 and a second outside diameter $OD_2$ proximal a second nozzle liner end 29. In an exemplary embodiment, the second outside diameter $OD_2$ may be smaller than the first outside diameter $OD_2$; however, in various other embodiments, the relative sizes of the first and second outside diameters $OD_1$ and $OD_2$ may be reversed. In an exemplary embodiment, the outside diameter of the exterior surface 52 may decrease proceeding from the first nozzle liner end 27 to the second nozzle liner end 29. Further, an angle $\beta$ may be defined between the exterior surface 52 and a line parallel to the nozzle axis 31, which may be referred to as the pitch of the exterior surface 52. In various exemplary embodiments, the pitch may be less than about 40 degrees, less than about 35 degrees, less than about 30 degrees, or less than about 25 degrees. In an exemplary embodiment, the pitch may be less than about 33 degrees, for example, between about 1 degree and about 15 degrees.

The nozzle liner 28 may also define first and second interior surfaces 48, 50 therein. In an exemplary embodiment, the first interior surface 48 may be tapered such that it converges toward the nozzle axis 31 proceeding from the first nozzle liner end 27 toward the second nozzle liner end 29. In an exemplary embodiment, the first interior surface 48 may more rapidly converge than does the exterior surface 52 (i.e., it may have a greater pitch), although in various other embodiments, the first interior surface 48 and the exterior surface 52 may converge at substantially the same rate, or the first interior surface 48 may converge less rapidly (i.e., it may have a lesser pitch) than the exterior surface 52. The first interior surface 48 may meet the second interior surface 50 between the first and second nozzle ends 27, 29. The second interior surface 50 may converge toward the central axis 31 proceeding to the second nozzle liner end 29. In other exemplary embodiments, the second interior surface 50 may converge less rapidly than the first interior surface 48, such that the first and second interior surfaces 48, 50 meet to form an angle therebetween. In still other exemplary embodiments, the second interior surface 50 may converge less rapidly than the exterior surface 52, or may not converge at all. It will be appreciated, however, that the relative geometries of the first and second interior surfaces 48, 50 and the exterior surface 52 are merely exemplary, may be reversed, may have additional other surfaces or elements disposed therein or therebetween, or may be otherwise altered without departing from the scope of this disclosure.

Figure 8:
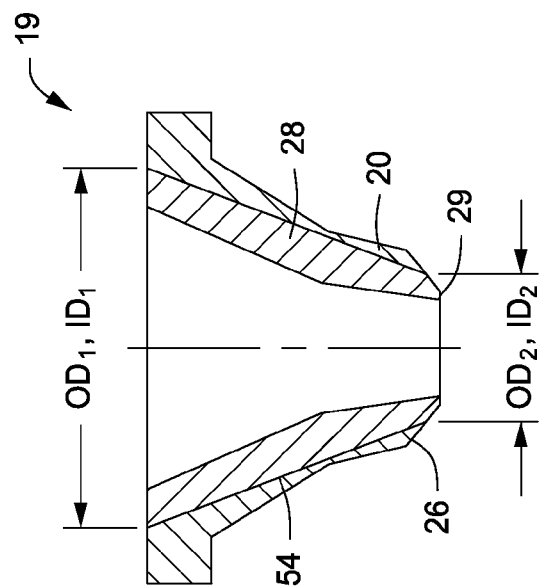
FIG. 8 illustrates a side cross-sectional view of the exemplary nozzle body with the exemplary nozzle liner disposed therein, in accordance with the disclosure.

With continuing reference to FIG. 1, FIG. 8 illustrates a side cross-sectional view of the nozzle liner 28 and the nozzle body 20 mated together to form an interface 54 therebetween, thereby forming the nozzle 19, according an exemplary embodiment. Prior to inserting the liner 28, the nozzle body 20 may be heated as at 106 of method 100. For example, the nozzle body 20 may be heated in the same or substantially similar parameters as those described above with reference to the casing 12 of FIG. 5. The nozzle body 20 may then be removed from the furnace, as at 108 of method 100.

The nozzle liner 28 may then be inserted into the nozzle body 20, as at 110 of method 100, although in various exemplary embodiments, the nozzle liner 28 may be inserted while the nozzle body 20 is still in the furnace. For example, the second nozzle liner end 29 may extend past the second nozzle end 26, as shown. However, in other exemplary embodiments, the second nozzle liner end 29 may be axially aligned with the second nozzle end 26 or may be stopped short thereof. After fitting the nozzle body 20 and the nozzle liner 28 together, the first inner and outer diameters $ID_1$, $OD_1$, and the second inner and outer diameters $ID_2$, $OD_2$ may be substantially the same, respectively, such that the nozzle liner 28 may be snugly received in the nozzle body 20.

The nozzle liner 28 may then be bonded to the nozzle body 20 by a solid-state bonding process (e.g., forge welding, explosive cladding, etc.), as at 112 of the method 100, to provide the nozzle 19. Subsequently, the nozzle 19 may be attached to a casing, for example, the casing 12 (FIG. 2). In other exemplary embodiments, the nozzle 19 may be attached prior to, after, or while heating the casing 12. It will be appreciated, however, that the nozzle 19 may be used with any structure desired, and is not necessarily limited to use with the casing 12. Furthermore, the solid-state bonding may proceed, for example, along the same or similar parameters as those described above with reference to the casing 12 and the corrosion-resistant liner 14 of FIG. 5. As such, the interface 54 formed between the nozzle liner 28 and the nozzle body 20 may be the same or similar to the interface 46, described above with reference to FIG. 5. Accordingly, the interface 54 may be free from weld-fill material or weld-created alloys, thereby obviating the necessity to monitor and maintain corrosion-susceptible welds. In various other exemplary embodiments, however, some additional weld-fill and/or weld-creating alloys may be required to support the solid-state bond.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A method for protecting an inner radial surface of a housing of a turbomachine from corrosion, comprising:
    tapering the inner radial surface of the housing and a corresponding outer radial surface of a corrosion-resistant liner;
    heating the housing to increase a diameter of the inner radial surface of the housing;
    inserting the corrosion-resistant liner at least partially into the housing; and
    attaching the corrosion-resistant liner to the inner radial surface of the housing a solid-state bonding process.

2. The method of claim 1, wherein the heating the housing comprises enlarging the diameter of the inner radial surface so that the outer radial surface of the corrosion-resistant liner slidably fits therein.

3. The method of claim 2, wherein the heating the housing comprises:
    placing the housing in a furnace at a temperature of between about 700° F. and about 900° F.; and
    increasing the temperature of the furnace to between about 1200° F. and about 2100° F.

4. The method of claim 3, wherein the heating the housing further comprises heating the housing for between about 30 minutes and about 90 minutes per inch of a cross-sectional thickness thereof.

5. The method of claim 3, further comprising:
    removing the housing from the furnace; and
    protecting an environment around the housing to avoid oxidizing the inner radial surface of the housing.

6. The method of claim 1, wherein the attaching the corrosion-resistant liner to the inner radial surface of the housing comprises forge welding the corrosion-resistant liner to the inner radial surface.

7. The method of claim 6, wherein the forge welding the corrosion-resistant liner to the inner radial surface comprises press forging the corrosion-resistant liner to the inner radial surface.

8. The method of claim 6, wherein the forge welding the corrosion-resistant liner to the inner radial surface comprises applying a pressure of from about 0.1 MPa to about 100 MPa to the corrosion-resistant liner using a hydraulic press forge.

9. The method of claim 1, wherein attaching the corrosion-resistant liner to the inner radial surface of the housing comprises explosive cladding the corrosion-resistant liner to the inner radial surface.

10. The method of claim 1, further comprising grit blasting the inner and outer radial surfaces to an RMS roughness of about 64 micro-inches or less, prior to heating the housing.

11. A method for protecting a turbomachine from corrosion, comprising:
    tapering an annular inner surface of a housing to define first and second inner diameters;
    tapering an annular outer surface of a corrosion-resistant liner to define first and second outer diameters, the first outer diameter and the first inner diameter being substantially the same size, and the second outer diameter and the second inner diameter being substantially the same size;
    enlarging the first and second inner diameters, comprising:
        placing the housing in a furnace at a temperature of from about 700° F. to about 900° F.;
        heating the furnace to an increased temperature of from about 1200° F. to about 2100° F.; and
        holding the housing in the furnace for about 1 hour per inch of a cross-sectional thickness of the housing;
    removing the housing from the furnace while protecting the housing in a protective atmosphere;
    inserting the corrosion-resistant liner at least partially into the housing such that the first outer diameter is substantially aligned with the first inner diameter; and
    fixing the corrosion-resistant liner to the housing by explosive cladding or by hot press forging the corrosion-resistant liner to the annular inner surface by applying a pressure of from about 0.1 MPa to about 100 MPa to the corrosion-resistant liner using a hydraulic press forge.

12. The method of claim 11, further comprising:
    tapering an inner nozzle surface of a nozzle body;
    heating the nozzle body in the furnace;
    removing the nozzle body from the furnace;
    inserting a tapered corrosion-resistant nozzle liner into the nozzle body;
    fixing the corrosion-resistant nozzle liner to the inner nozzle surface by explosive cladding or by hot press forging the corrosion-resistant nozzle liner to the inner nozzle surface by applying a pressure of from about 0.1 MPa to about 100 MPa to the corrosion-resistant liner using a press forge; and
    attaching the nozzle body to the housing proximal a radial aperture defined therein.

* * * * *